United States Patent
Grant et al.

(10) Patent No.: US 11,421,662 B2
(45) Date of Patent: Aug. 23, 2022

(54) INTEGRALLY SUPPORTED COOLING DEVICE

(71) Applicant: NISSENS COOLING SOLUTIONS A/S, Horsens (DK)

(72) Inventors: Martin Grant, Horsens (DK); Morten Mørkholt, Horsens (DK)

(73) Assignee: Nissens Cooling Solutions A/S, Horsens (DK)

( * ) Notice: Subject to any disclaimer, the term of this patent is extended or adjusted under 35 U.S.C. 154(b) by 331 days.

(21) Appl. No.: 16/621,016

(22) PCT Filed: Jun. 28, 2018

(86) PCT No.: PCT/EP2018/067448
§ 371 (c)(1),
(2) Date: Dec. 10, 2019

(87) PCT Pub. No.: WO2019/002483
PCT Pub. Date: Jan. 3, 2019

(65) Prior Publication Data
US 2020/0200152 A1  Jun. 25, 2020

(30) Foreign Application Priority Data
Jun. 29, 2017 (EP) .................. 17178677

(51) Int. Cl.
*F03D 80/60* (2016.01)
*F03D 80/80* (2016.01)
*F28F 9/26* (2006.01)

(52) U.S. Cl.
CPC ............ *F03D 80/60* (2016.05); *F03D 80/80* (2016.05); *F28F 9/262* (2013.01); *F05B 2260/60* (2013.01); *F28F 2280/00* (2013.01)

(58) Field of Classification Search
CPC ................. F28F 9/262; F28F 2280/00; F05B 2260/20–2241; F03D 80/60; F28D 1/0443; F28D 1/05375
See application file for complete search history.

(56) References Cited

U.S. PATENT DOCUMENTS 7,168,251 B1    1/2007  Janssen
8,052,383 B2 *  11/2011 Frokjaer ............. F03D 80/60
                                                  415/178

(Continued)

FOREIGN PATENT DOCUMENTS

AU    2013225485 A1    9/2014
CA    2 980 397       10/2016

(Continued)

OTHER PUBLICATIONS

International Search Report and Written Opinion of the ISA for PCT/EP2018/067448 dated Oct. 2, 2018, 13 pages.

(Continued)

*Primary Examiner* — Richard A Edgar
(74) *Attorney, Agent, or Firm* — Nixon & Vanderhye P.C.

(57) ABSTRACT

An integrally supported cooling device for mounting to a wind turbine nacelle having a first face with a longitudinal extension in a wind direction. The cooling device has at least one heat exchanger core configured to extend across the wind direction and to define a cooling area of the cooling device, the heat exchanger core having a first side and a second side arranged opposite the first side in relation to the heat exchanger core, a first manifold being arranged along the first side and a second manifold being arranged along the second side, each in fluid communication with the at least one heat exchanger core. The pair of manifolds extend parallel along the cooling area, whereby the second manifold has a suspension and the cooling device is configured to (Continued)

Figure 1:
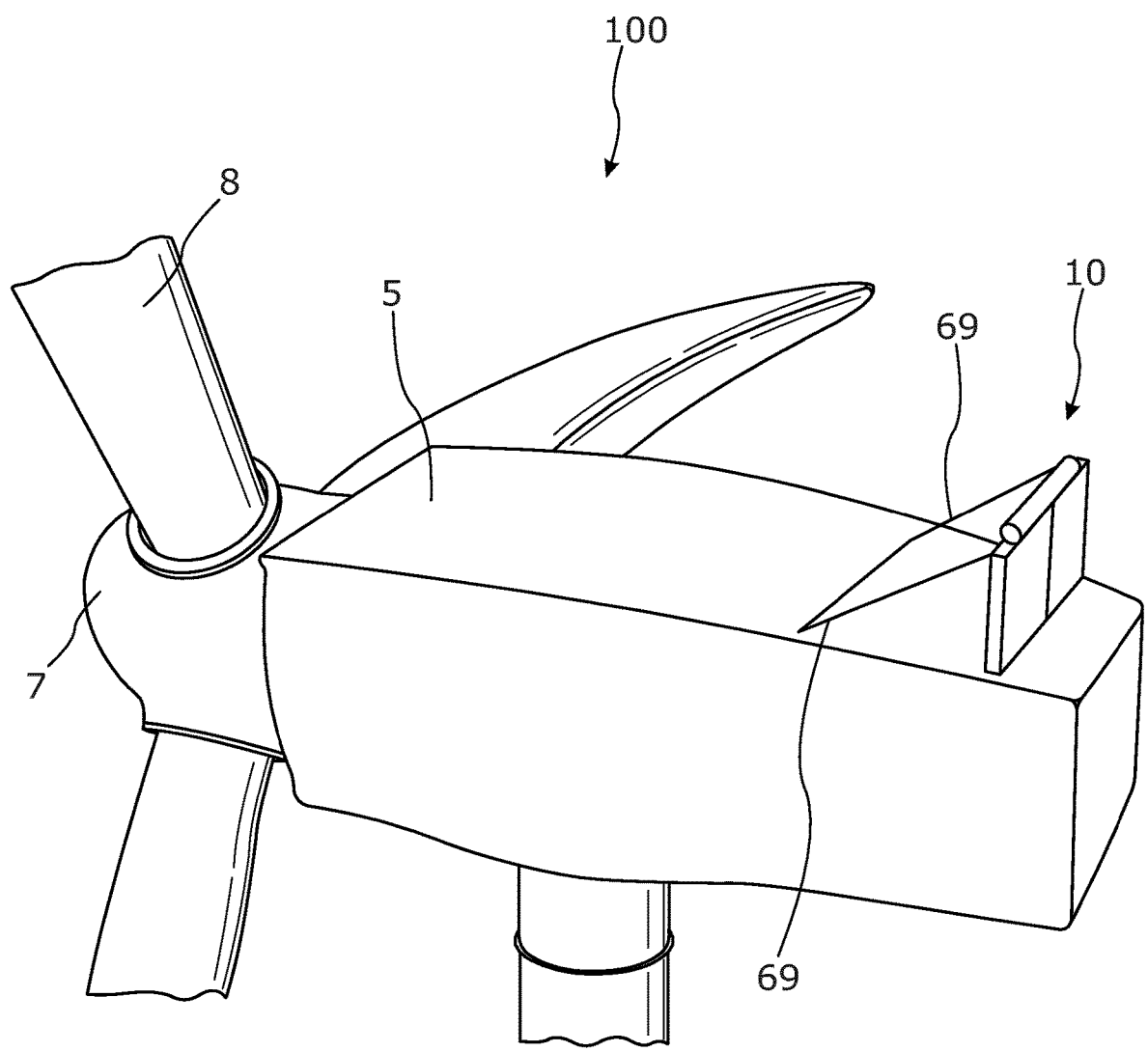

be mounted to the wind turbine nacelle by suspension of the second manifold to the first face of the wind turbine nacelle via the suspension.

20 Claims, 4 Drawing Sheets

(56) References Cited

U.S. PATENT DOCUMENTS

| | | | |
|---|---|---|---|
| 9,074,582 B2 * | 7/2015 | Sivalingam | F03D 80/60 |
| 9,359,911 B2 * | 6/2016 | Abolfazlian | F03D 80/60 |
| 2010/0034653 A1 | 2/2010 | Frokjaer | |
| 2012/0186795 A1 | 7/2012 | Pustelnik et al. | |

FOREIGN PATENT DOCUMENTS

| | | | | |
|---|---|---|---|---|
| CA | 2980397 A1 * | 10/2016 | | F03D 80/60 |
| CN | 204085301 | 1/2015 | | |
| CN | 204085301 U * | 1/2015 | | |
| CN | 106640555 A | 5/2017 | | |
| KR | 10-2008-0010935 | 1/2008 | | |

OTHER PUBLICATIONS

Extended Search Report for EP17178677.5 dated Dec. 12, 2017, 8 pages.
International Preliminary Report on Patentability dated Dec. 31, 2019 in International Application No. PCT/EP2018/067448, 7 pages.
Notification of the First Office Action dated May 31, 2021 in Chinese Application No. 201880039528.6, with English translation, 15 pages.

* cited by examiner

INTEGRALLY SUPPORTED COOLING DEVICE

This application is the U.S. national phase of International Application No. PCT/EP2018/067448 filed Jun. 28, 2018 which designated the U.S. and claims priority to EP Patent Application No. 17178677.5 filed Jun. 29, 2017, the entire contents of each of which are hereby incorporated by reference.

The present invention relates to an integrally supported cooling device for mounting to a wind turbine nacelle without a mounting frame. The wind turbine nacelle has a first face with a longitudinal extension in a wind direction, whereby the cooling device comprises at least one heat exchanger core configured to extend across the wind direction and to define a cooling area of the cooling device and a first manifold and a second manifold each in fluid communication with the at least one heat exchanger core, the pair of manifolds extending parallel along the cooling area.

A wind turbine converts wind power into electrical energy by using a generator placed among other equipment in the nacelle of the wind turbine. When the generator converts energy, the air surrounding the equipment is heated and the equipment itself is thus also heated.

When the equipment is heated, the efficiency with which the conversion occurs is substantially decreased. In order to cool the equipment, the walls and the air surrounding the equipment are cooled down by means of a heat sink positioned on top of the nacelle. Thus, the cool outside air passes through the heat sink and cools a fluid within the heat sink, which is subsequently used to cool the walls, equipment in the wind turbine or the air surrounding the equipment.

However, such cooling constructions have previously required large and weighty mounting frames for assembly with the wind turbine nacelle, which increases the production costs as well as the costs for assembly and mounting of the wind turbine.

Furthermore, known cooling devices for wind turbine nacelles which are optimised to achieve a large cooling effect has a large amount of relatively thin cooling pipes across the cooling area. This causes an increase in pressure drop due to the pumping of cooling fluid along a lengthy fluid path through the cooling pipes.

To ensure that no negative structural effects on the cooling device and the wind turbine nacelle can occur due to the pressure drop, the cooling device may be dimensioned to be larger, i.e. by having larger cooling pipes and thicker heat exchanger cores, which increases the production costs and requires more costly and complex mounting arrangements.

Accordingly, conventional cooling devices have shown not to provide a solution which allows for a less costly mounting arrangement.

It is an object of the present invention to wholly or partly overcome the above disadvantages and drawbacks of the prior art. More specifically, it is an object to provide an improved cooling device which can be mounted to the wind turbine nacelle in a simple and a cost-efficient manner and involves lower production costs.

The above objects, together with numerous other objects, advantages, and features, which will become evident from the below description, are accomplished by a solution in accordance with the present invention by an integrally supported cooling device for mounting to a wind turbine nacelle without a mounting frame, the wind turbine nacelle having a first face with a longitudinal extension in a wind direction, the cooling device comprises:

- at least one heat exchanger core configured to extend across the wind direction and to define a cooling area of the integrally supported cooling device, the heat exchanger core having a first side and a second side arranged opposite the first side in relation to the heat exchanger core,
- a first manifold being arranged along the first side and a second manifold being arranged along the second side, each in fluid communication with the at least one heat exchanger core, the first manifold and the second manifold are extending parallel along the cooling area, wherein the second manifold comprises suspension means and the cooling device is adapted to be mounted to the wind turbine nacelle by suspension of the second manifold to the first face of the wind turbine nacelle via said suspension means.

Furthermore, the cooling device may be a passive cooling device.

To increase the cooling capacity the cooling device may comprise a plurality of heat exchanger cores in a row extending along the cooling area.

Moreover, the cooling device may comprise a first fixating beam extending along a first surface of the second manifold, whereby the fixating beam is fixed to the first surface of the second manifold via the suspension means, the fixating beam being adapted to be attached to the first face of the wind turbine nacelle.

Thus, a cooling device which can be mounted to a wind turbine nacelle in a stable and robust manner at a lower cost since less material is required can be achieved.

In one embodiment, the cooling device may further comprise an expansion vessel in fluid connection with one of the manifolds. The expansion vessel further serves to protect the cooling device from excessive cooling fluid pressure. Thereby, the cooling device can be dimensioned according to a lower maximum allowed pressure which allows for a more cost-efficient and compact cooling device.

In addition, the cooling device may comprise a top fixating beam extending along a top surface of the first manifold, whereby the top fixating beam is fixed to the expansion vessel and the top surface of the first manifold.

The first manifold may be adapted to receive a plurality of diagonally extending supporting struts for connecting the cooling device and the first face of the wind turbine nacelle. Thus, further support against the pressure generated by the wind colliding with the cooling area of the cooling device is achieved.

In one embodiment, the first manifold and second manifold may each have a proximal end and a distal end along a length l of the cooling area, whereby one of the manifolds comprises a coolant inlet arranged in the proximity of the proximal end and one of the manifolds comprises a coolant outlet arranged in the proximity of the distal end.

The second manifold may comprise the coolant inlet and the coolant outlet. This allows for a more efficient mounting to the wind turbine nacelle, since no further interfaces are required in order to connect the inlet and outlet to the cooling system of the wind turbine nacelle.

In one embodiment, the manifolds may be connected by means of a first fluid connection and a second fluid connection, whereby the second manifold comprises a proximal second manifold compartment and a distal second manifold compartment. Said manifold compartments are separate from one another. The first manifold compartment may comprise a proximal first manifold compartment and a distal first manifold compartment, said manifold compartments being separate from one another, whereby the first fluid connection connects the proximal second manifold compartment and the distal first manifold compartment, and the second fluid connection connects the proximal first manifold compartment and the distal second manifold compartment.

Thus, the cooling is effectively divided along the length of the cooling area, since a first portion of the cooling fluid is cooled in one section of cooling device and a second portion of the cooling fluid is cooled in another. Hence, the sheer volume of cooling fluid meant to pass through each cooling pipe of the heat exchanger core(s) is reduced, whereby a lesser pressure drop throughout the cooling area is achieved. A lesser pressure drop enables usage of smaller, i.e. thinner, heat exchanger cores, whereby a more cost-efficient as well as lighter cooling device is achieved. Furthermore, it allows for the usage of a less bulky and weighty mounting arrangement for mounting the cooling device on the wind turbine nacelle, since the same structural strength is not required.

Furthermore, the heat exchanger core may comprise a plurality of cooling pipes, the cooling pipes having a first flow area, the manifold compartments have a second flow area, the second flow area being larger than the first flow area.

Hereby is obtained that when the cooling fluid is being introduced into the coolant inlet will first be distributed in the manifold compartment and led to the second manifold compartment via the connection before entering into the heat exchanger cores.

Additionally, the fluid connections may have a third flow area being equal to or larger than the first flow area.

To further reduce the pressure drop, the first fluid connection may be adapted to distribute approximately 45-55% of the cooling fluid entering the proximal second manifold compartment directly to the distal first manifold compartment without the cooling fluid entering the heat exchanger cores.

Advantageously, the fluid connections may be disposed at a distance d along the length l from the proximal end, whereby $0.25l<d<0.75l$, and more preferably $0.4l<d<0.6l$. Thus, the structural load generated by the pressure drop becomes more evenly distributed, making the cooling device more robust.

In one embodiment, the cooling device may further comprise a first additional fluid connection connecting the distal second manifold compartment to an additional first manifold compartment and a second additional fluid connection connecting the distal first manifold compartment to an additional second manifold compartment, the additional manifold compartments being disposed along the length l of the cooling area distally to the distal manifold compartments. The additional splitting of the cooling fluid flow allows for an even lower pressure drop.

Preferably, the first and second fluid connections may be disposed at a distance d1 along the length l from the proximal end and the first and second additional fluid connections are disposed at a distance d2 along the length l from the proximal end, whereby $0.25 l<d1<0.45 l$ and $d2$ $0.55 l<d2<0.75 l$. Thus, the structural load due to pressure drop is more evenly distributed along the length of the cooling device.

To further ensure the robustness of the cooling device when mounted to the wind turbine nacelle, the second manifold may be adapted to be further connected to the first face of the wind turbine nacelle via a plurality of supporting legs.

The first fixating beam may, in one embodiment, be fixed to the second manifold by means of a plurality of bolts. Preferably, the plurality of bolts may extend into the second manifold from the first fixating beam in a vertical direction, which allows for a more user-friendly and cost-efficient assembling process.

In one embodiment, the first fixating beam may extend along the first surface of the second manifold along a distance corresponding to 0.5 l-0.75 l. Thus, the first fixating beam increases the torsional stiffness of the cooling device in a manner which does not increase the weight of said cooling device drastically.

Preferably, the first fixating beam may a U-profile beam. The U-profile beam allows for the second manifold to be inserted into the profile, which further increases the robustness of the cooling device.

In one embodiment, the top fixating beam may extend along the top surface of the first manifold along a distance corresponding to 0.5 l-0.75 l.

The expansion vessel may be fixed to the top fixating beam by means of a plurality of fastening elements. In one embodiment, the fastening elements may be cable ties extending around the expansion vessel.

The length l of the cooling area of the cooling device may be approximately 3-5 metres and a height h of said cooling area defined by the at least one heat exchanger may be approximately 1-2 metres.

In one embodiment, the coolant inlet and/or the coolant outlet may be connected to fluid lines each extending through a respective supporting leg.

Finally, the invention also relates to a wind turbine comprising a wind turbine nacelle as described above.

Figure 2:
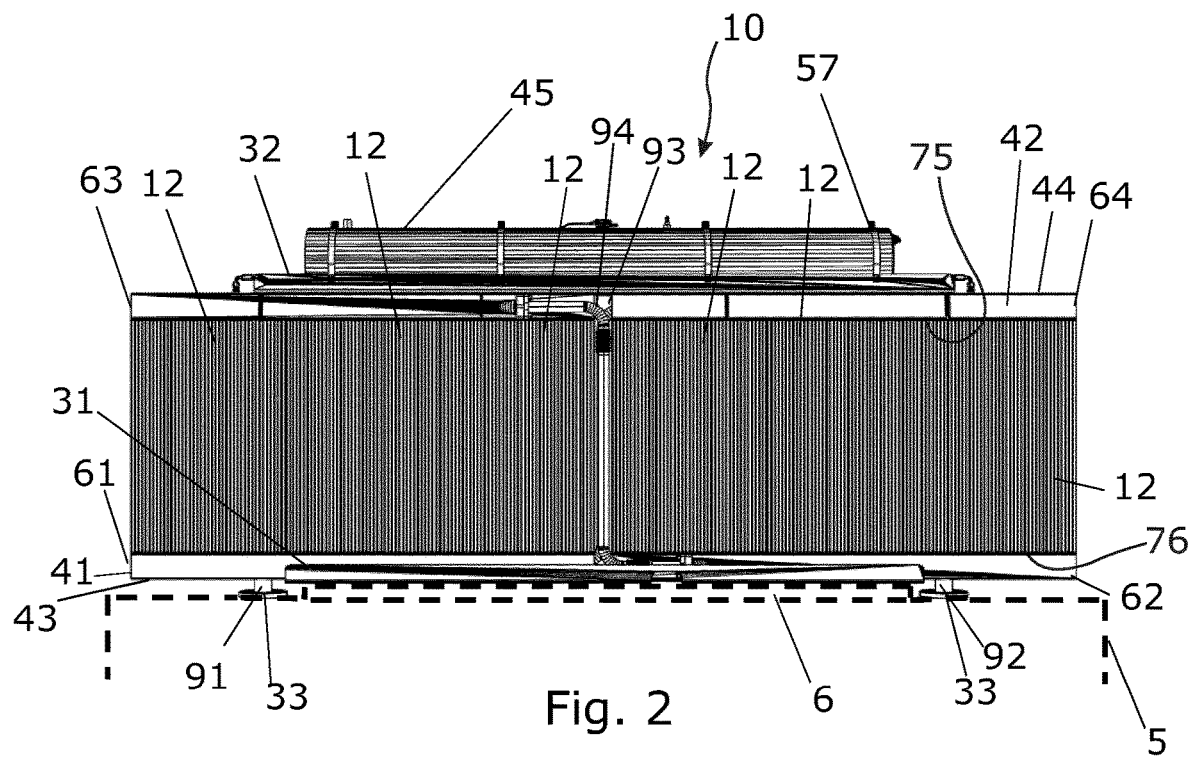
Figure 3:
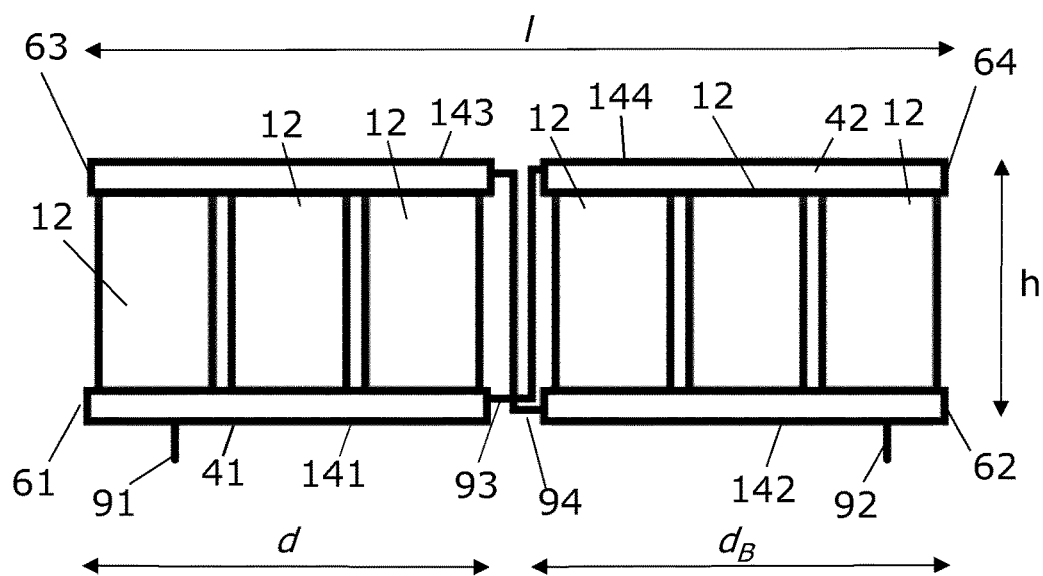
Figure 4:
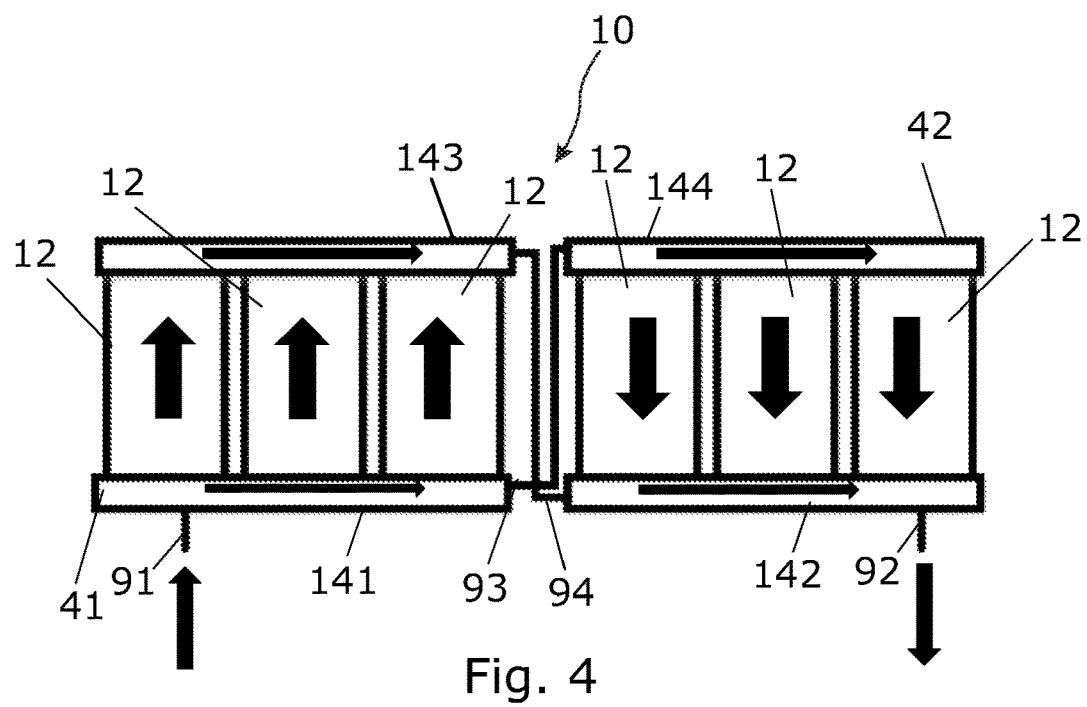
Figure 5:
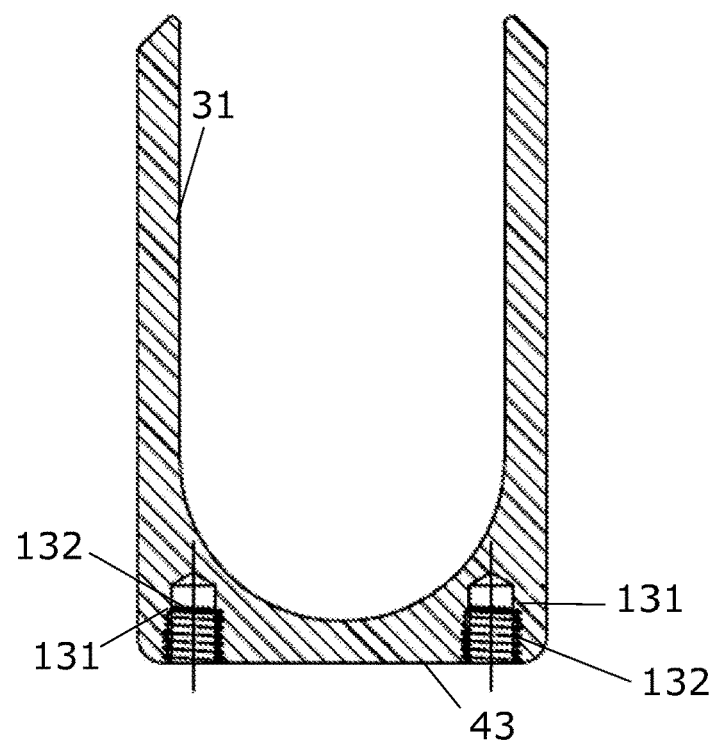
Figure 6:
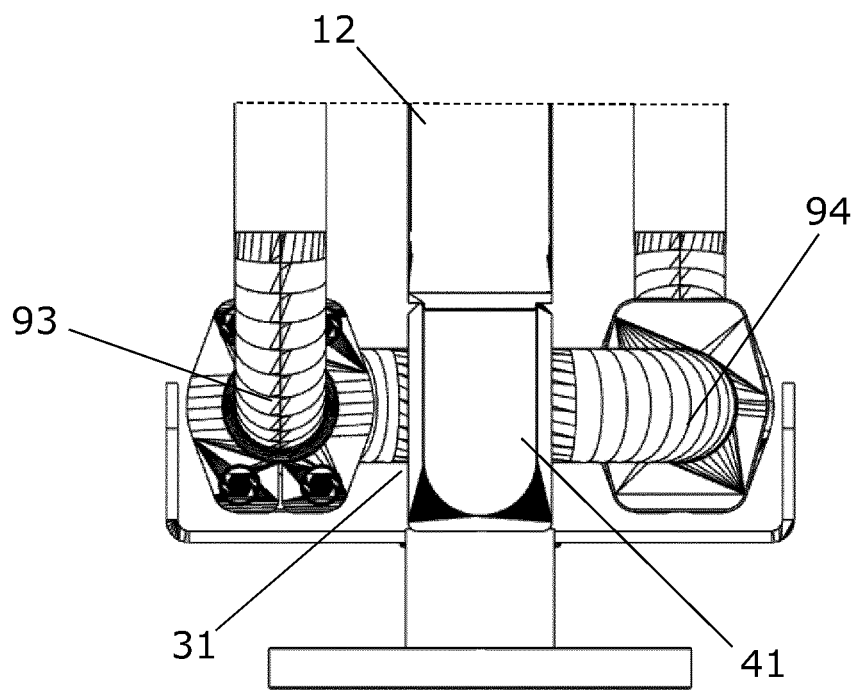
Figure 7:
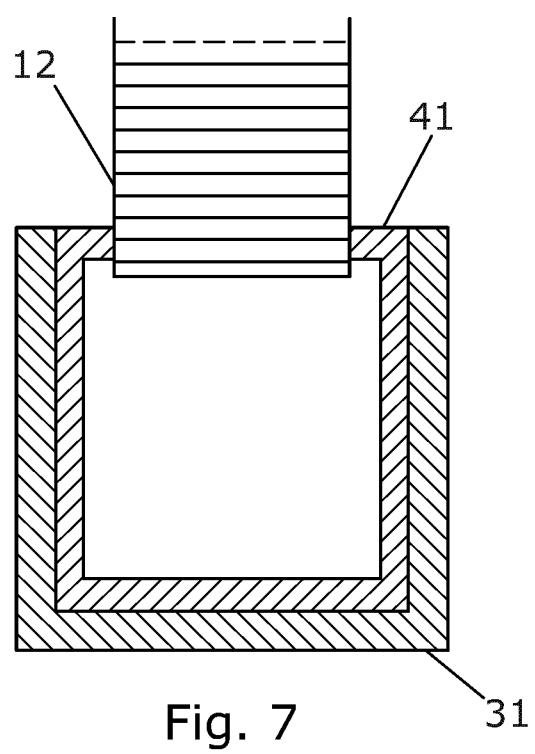

The invention and its many advantages will be described in more detail below with reference to the accompanying schematic drawings, which for the purpose of illustration show some non-limiting embodiments and in which:

FIG. 1 shows a perspective view of a wind turbine nacelle comprising a cooling device of one embodiment, FIG. 2 shows a front view of a cooling device of one embodiment, FIG. 3 shows a schematic view of a cooling device of one embodiment, FIG. 4 shows a schematic view of a cooling device of the same embodiment, FIG. 5 shows a cross-section view of a second manifold of one embodiment, FIG. 6 shows a side view of a second manifold of one embodiment, and FIG. 7 shows a schematic cross-section view of a second manifold of one embodiment.

All the figures are highly schematic and not necessarily to scale, and they show only those parts which are necessary in order to elucidate the invention, other parts being omitted or merely suggested.

FIG. 1 shows a perspective view of a wind turbine nacelle 100 comprising a cooling device 10 for mounting to said wind turbine nacelle 100 without a mounting frame, hereinafter referred to as cooling device 10. The wind turbine nacelle 100 is situated on top of a tower and has a front facing a hub 7 in which a plurality of rotor blades 8, normally three blades, is fastened. The wind turbine nacelle 100 may house a generator and other equipment used for driving the conversion process of wind energy to electricity—also called the drive train. When producing electricity, the drive train produces a lot of heat, resulting in a less effective conversion process.

In other words, the cooling device 10 serves to be supported by suspension of its functional components (i.e. the manifolds) without requiring a mounting frame for securing the cooling device to the nacelle 100. Accordingly, the cooling device 10 is a self-sustaining cooling device.

In order to cool the equipment and other parts of the nacelle, a cooling device 10, i.e. a self-sustaining cooling device, is arranged outside the nacelle 100. Wind flowing along a longitudinal extension of the nacelle flows in through at least one cooling area of the cooling device 10 and cools a fluid within the cooling device. The cooled fluid exchanges heat with the parts of the nacelle 100 or equipment to be cooled. The wind turbine nacelle 100 has a first face 5 with a longitudinal extension in the wind direction.

The present invention will mainly be described in connection with an upwind wind turbine, i.e. a wind turbine where the nacelle is placed downwind from the wind turbine blades. However, the invention may also advantageously be implemented in a downwind wind turbine, i.e. a wind turbine where the nacelle is placed upwind from the wind turbine blades.

FIG. 2 shows a cooling device 10 for the wind turbine nacelle according to the present invention. The wind turbine nacelle 100 having a first face 5 with a longitudinal extension in a wind direction. The cooling device 10 comprises:
- at least one heat exchanger core 12 configured to extend across the wind direction and to define a cooling area of the cooling device 10, the heat exchanger core 12 having a first side 75 and a second side 76 arranged opposite the first side in relation to the heat exchanger core,
- a first manifold 42 being arranged along the first side 75 and a second manifold 41 being arranged along the second side 76 each in fluid communication with the at least one heat exchanger core 12, the pair of manifolds 41, 42 extending parallel along the cooling area.

Further referring to FIG. 2, the second manifold 41 comprises suspension means and the cooling device 10 is adapted to be mounted to the wind turbine nacelle 100 by suspension of the second manifold 41 to the first face 5 of the wind turbine nacelle 100 via said suspension means. Thus, the cooling device 10 can be mounted to the wind turbine nacelle 100 without a heavy mounting frame, which leads to a more expensive mounting process and production process. Advantageously, the cooling device 10 may be mounted to the wind turbine nacelle 100 solely by suspension of the second manifold 41 to the wind turbine nacelle 10. Furthermore, in one embodiment, the self-sustained cooling device 10 may be mounted to the wind turbine nacelle 100 solely by suspension of any of the manifolds 41, 42 or both.

Preferably, the self-sustaining cooling device 10 is a passive cooling device.

Said suspension means may include any conventional suspension means, such as a first surface 43 of the second manifold 41 suitable for welding and a weld (as shown in FIG. 2), holes 131 for receiving screws or bolts 132 (as shown in FIG. 5), fixtures or fittings. Notably, the second manifold 41 may be suspended to the nacelle both directly by for example fittings on the face of the nacelle 100 or indirectly by means of for example a fixating beam 31 (as shown in FIG. 2).

A number of suspension means are well-known for the skilled person and suitable for implementing in connection to the second manifold 41 and will therefore not be described in detail.

To increase the cooling area and/or increase the flexibility of the cooling capacity by adding or subtracting the heat exchanger cores 12, the cooling device 10 may, in one embodiment, comprise a plurality of heat exchanger cores 12 in a row extending along the cooling area.

By pumping cooling fluid through the cooling pipes extending throughout the heat exchanger core(s), a pressure drop occurs towards the outlet(s) of the heat exchanger due to both the cooling of the cooling fluid in the heat exchanger core(s) and most importantly due to the relatively thin and winding coolant pipes. A solution in order to reduce the pressure drop is described below:

Again referring to FIG. 2, the first manifold 42 and second manifold 41 each have a proximal end 61, 63 and a distal end 62, 64 along a length l of the cooling area, i.e. the first manifold 42 has the proximal end 63 and the distal end 64 and the second manifold 41 has the proximal end 61 and the distal end 62. In one embodiment, one of the manifolds 41, 42 comprises a coolant inlet 91 disposed in the proximity of the proximal end 61, 63, and one of the manifolds 41, 42 comprises a coolant outlet 92 disposed in the proximity of the distal end 62, 64.

Preferably, the second manifold 41 comprises the coolant inlet 91 and the coolant outlet 92. This allows for simpler fitting of the cooling device 10 to the cooling system interface situated inside the wind turbine nacelle 100, since the cooling fluid does not have to be rerouted by means of connecting hoses to the first manifold from the wind turbine nacelle or having additional structures with passages for leading the cooling fluid upwards towards the first manifold of the cooling device.

With further reference to FIGS. 2 and 3, the manifolds 41, 42 are connected by means of a first fluid connection 93 and second fluid connection 94. The fluid connections 93 and 94 extend outside the heat exchanger cores 12. The second manifold 41 comprises a proximal second manifold compartment 141 and a distal second manifold compartment 142, said manifold compartments being separate from one another, i.e. said compartments are not in direct fluid communication. The first manifold compartment 42 comprises a proximal first manifold compartment 143 and a distal first manifold compartment 144, said manifold compartments being separate from one another, i.e. said compartments are not in direct fluid communication. The first fluid connection 93 connects the proximal second manifold compartment 141, and the distal first manifold compartment 144 and the second fluid connection 94 connect the proximal first manifold compartment 143 and the distal second manifold compartment 142.

Hence, fluid communication is provided between the first and second manifolds without the cooling fluid entering the cooling pipes of the heat exchanger cores 12. The flow of cooling fluid running through the cooling pipes of the one or more heat exchanger cores 12 is thus split, effectively reducing the pressure drop through the cooling device 10.

The compartments of the second manifold 41 and the first manifold 42 may be both separate manifold units extending along the length of the cooling area connected by means of the fluid connections 93, 94. Said compartments may also be achieved by providing the second manifold 41 and first manifold 42 with fluid-tight separating walls.

The fluid connections 93 and 94 may be for example hoses or pipes which extend in a vertical direction parallel to cooling pipes of the heat exchanger cores 12. Advantageously, the ends of each fluid connection are bent so as to connect to the compartments of the first manifold 42 and second manifold 41.

Referring to FIG. 4, the cooling fluid flow through the cooling device 10 is depicted. The cooling fluid flow is referenced with the arrows extending through the cooling device 10. As seen in said figure, the cooling fluid flows through the cooling device 10 in a figure-8 type manner, wherein the cooling fluid enters the cooling device via the inlet 91 and exits via the outlet 92.

The warm cooling fluid entering through the inlet 91 is led into the proximal second manifold compartment 141 of the second manifold 41, wherein it is distributed through the heat exchanger cores 12 connected to said compartment.

However, a portion of the cooling fluid will be led through the fluid connection 93 and thereby enter the distal first manifold compartment 144 of the first manifold 42. In the distal first manifold compartment 144, the warm cooling fluid is led downwards through the cooling pipes of the heat exchanger cores 12 connected with said compartment, thus entering the distal second manifold compartment 142. Said distal second manifold compartment is connected with the outlet 92, whereby the cooling fluid is led back into the wind turbine nacelle.

The portion of the cooling fluid which is led upwards through the heat exchanger cores connected to the proximal second manifold compartment 141 is led into the proximal first manifold compartment 143 and is consequently cooled along the way. The now cooled cooling fluid inside said proximal first manifold compartment 143 is led to the distal second manifold compartment 142 by means of the second fluid connection 94. Said distal second manifold compartment is connected with the outlet 92, whereby the cooling fluid is led back into the wind turbine nacelle.

Thus, all of the cooling fluid entering the cooling device is cooled while the cooling flow is effectively split between different portions of the cooling area, i.e. different heat exchanger cores 12. Due to the cooling fluid's tendency to choose the path of the least resistance and the length of the fluid connections being similar to the length of the cooling pipes of heat exchanger cores, a portion of the cooling fluid will pass through the first fluid connection 93 without entering the heat exchanger cores 12 in fluid communication with the manifold compartments 141 and 143. Hence, not all of the cooling fluid will be forced to enter through the thin cooling pipes at the same positon along the cooling area, whereby the pressure drop is severely reduced. This allows for usage of lighter and less bulky radiators which can be supported solely by suspension of the second manifold 41, i.e. not requiring a mounting frame.

To minimise the pressure drop, the first fluid connection 93 is adapted to distribute approximately 45-55% of the cooling fluid entering the proximal second manifold compartment 141 directly to the distal first manifold compartment 144 without the cooling fluid entering the heat exchanger cores 12. Accordingly, approximately 45-55% of the cooling fluid will be cooled directly through the aforementioned heat exchanger cores 12 and then pass to the outlet 92 via the second fluid connection 94 and the distal second manifold compartment 142. This may be achieved by dimensioning the length and/or flow diameter of the first fluid connection 93 so as to alter the pressure distribution in relation to the cooling pipes of the heat exchanger cores 12.

A lowering of the pressure drop may for example enable a cooling device which is cheaper to manufacture and mount to a wind turbine nacelle. This may be achieved via a less bulky and weighty mounting arrangement and/or thinner heat exchanger cores, since said heat exchanger cores do not have to be dimensioned to withstand a high pressure drop.

As is known to the skilled person, the most optimal flow pattern through a cooling device is for the cooling fluid to flow diagonally from top to bottom.

Hence, it is particularly advantageous to utilise the split-flow features described above in a cooling device with the inlet 91 and 92 in connection to the second manifold 41. This allows for a cooling device which is easier and more cost-efficient to mount to an existing wind turbine nacelle by allowing for mounting in a single plane, i.e. face 5 of the nacelle. Furthermore, the split-flow features allows for a diagonal flow between the first and second manifolds through the cooling device, which leads to a more efficient cooling in comparison to a non-split cooling device with the inlet and outlet being connected to the second manifold, since the cooling device 10 at least partly achieves the desired diagonal flow pattern (between the distal manifold compartments). Accordingly, a cooling device which is both more efficient in terms of cooling and easier to mount to a wind turbine nacelle is achieved.

Referring again to FIG. 3, the fluid connections 93, 94 may be disposed at a distance d along the length l from the proximal end 61, 63, whereby $0.25l<d<0.75l$, and more preferably $0.41l<d<0.6l$. Thus, the structural load generated by the pressure drop is distributed more evenly along the length of the cooling device, making the cooling device more robust and sturdy.

To further decrease the pressure drop, further fluid connections and separate compartments of the first and second manifolds may be provided. Accordingly, the cooling device 10 may further comprise a first additional fluid connection connecting the distal second manifold compartment 142 to an additional first manifold compartment and a second additional fluid connection connecting the distal first manifold compartment 144 to an additional second manifold compartment, the additional manifold compartments being disposed along the length l of the cooling area distally to the distal manifold compartments 142, 144.

To optimise the distribution of the load generated by the pressure drop, the first and second fluid connections 93, 94 may be disposed at a distance d1 along the length l from the proximal end 61, 63, and the first and second additional fluid connections may be disposed at a distance d2 along the length l from the proximal end 61, 63, whereby $0.25 l<d1<0.45 l$ and $0.55 l<d2<0.75 l$.

As is recognised by the skilled person, any number of evenly distributed additional fluid connections and manifold compartments along the length of the cooling area may be applicable.

A split-flow solution according to any of the aforementioned examples is especially beneficial in conjunction with a cooling device according to the invention, since a lowering of the pressure drop enables usage of heat exchanger(s) with smaller dimensions. Thereby, a lighter self-sustaining mounting arrangement can be achieved without risking structural damage due to the frictional shear forces associated with the pressure drop as well as the load exerted on the cooling device due to the difference in pressure along the cooling area. The mounting of a cooling device to a wind turbine nacelle is a complicated as well as resource and time consuming process due to the large dimensions and high weight of the cooling device as well as the altitude of wind turbine nacelle. Accordingly, it is essential to achieve a lighter, more efficient cooling device which can be mounted without adding further complex structural components, as is enabled with the aforementioned embodiments of the cooling device 10.

Again referring to FIG. 2, to achieve a cooling device which can be mounted in a safer and more robust manner to the wind turbine nacelle without requiring a weighty mounting frame, the cooling device may further comprise a first fixating beam 31 extending along a first surface 43 of the second manifold 41, the fixating beam 31 being fixed to the first surface 43 of the second manifold 41 via the suspension means, the fixating beam being adapted to be attached to the first face 5 of the wind turbine nacelle 100. The fixating beam 31 may be attached to the first face 5 via a support structure 6 of the wind turbine nacelle. The first fixating beam 31 serves to increase the stability and torsional rigidity during transport of the cooling device 10. Furthermore, it is particularly advantageous with a plurality of heat exchangers 12, since it allows for a more robust cooling device which keeps the heat exchangers 12 aligned and secured in a robust manner.

The suspension means may for example be a weld extending along the first surface 43 connecting to the fixating beam or threaded holes 131 for receiving bolts 132 connecting the fixating beam and the second manifold, as depicted in FIG. 5.

As seen in FIG. 2, the first fixating beam 32 may extend along the first surface 43 of the second manifold 41 along a distance corresponding to between 0.5l and 0.75l. Thereby, an increased torsional rigidity is achieved.

The cooling device 10 may further comprise an expansion vessel 45 in fluid connection with one of the manifolds 41, 42. Thus, the cooling device becomes more robust and sustainable for rapid changes in pressure due to the expansion vessel being partially filled with air which can absorb excess pressure as well as cushion shocks due to water hammer. The expansion vessel 45 may have a volume of between 100 and 200 litres.

Advantageously, the cooling device 10 may further comprise a top fixating beam 32 extending along a top surface 44 of the first manifold 42, whereby the top fixating beam 32 is fixed to the expansion vessel 45 and the top surface 44 of the first manifold 42. The positioning of the expansion vessel on top of the first manifold allows for a more compact cooling device. Furthermore, positioning the expansion vessel above heat exchanger cores facilitates possible generated steam as well as reduces the pressure in the cooling pipes of the heat exchanger cores.

Preferably, the top fixating beam is fixed to the first manifold 42 by means of bolts extending into the first manifold 42.

With reference to FIG. 2, the expansion vessel 45 may be fixed to the second fixating beam 32 by means of a plurality of fastening elements 57. Preferably, the fastening elements may be cable ties connected to the second fixating beam 32 and extending around the expansion vessel 45.

The cooling device 10 may be further adapted to be further connected to the first face 5 of the wind turbine nacelle 100 via a plurality of supporting legs 33. Accordingly, the coolant inlet 91 and/or the coolant outlet 92 may be connected to fluid lines each extending through a respective supporting leg 33, whereby said fluid lines are adapted to lead the cooling fluid to and from the wind turbine nacelle.

Referring again to FIGS. 1 and 2, the first manifold 42 is configured to receive a plurality of diagonally extending supporting struts 69 (shown in FIG. 1) for connecting the cooling device 10 and the first face 5 of the wind turbine nacelle 100. Said struts extend diagonally downwards towards the first face 5 of the wind turbine nacelle 100. The struts provide additional support for the cooling device when it is mounted to the wind turbine nacelle. The struts may advantageously be in the form of metal wires connected to the wind turbine nacelle 100 and the first manifold 42. According to some embodiments, the second fixating beam 32 may be adapted to receive a plurality of diagonally extending support struts 69 for connecting the cooling device 10 and the first face 5 of the wind turbine nacelle 100. The second fixating beam or first manifold may be adapted to receive the struts by any conventional means, such as for example by comprising a plurality of eye bolts or loops, each adapted to receive one of the diagonal struts.

The provision of the struts 69 allows for compensation for the pressure exercised on the cooling area by the wind. Accordingly, the struts 69 may extend from a backside in relation to the wind direction of the first manifold 42 or the second fixating beam 32.

Preferably, again referring to FIG. 3, the length l of the cooling area defined by the at least one heat exchanger 12 is approximately 3-5 metres. A height h of said cooling area defined by the at least one heat exchanger 12 may be approximately 1-2 metres.

Turning to FIG. 5, a cross-section view of a part of the second manifold 41 is depicted. The first fixating beam 31 is fixed to the second manifold 41 by means of a plurality of bolts 132. The bolts 132 extend through said first fixating beam 31 (not shown in FIG. 5). Preferably, the plurality of bolts 132 extend into the second manifold 41 from the first fixating beam 31 in a vertical direction. Thus, the risk for material damages is reduced compared to having the bolts extend through a side surface of the manifold. This is due to the thickness of the material along the bottom of the second manifold usually being thicker than the side surfaces of said second manifold. A more robust and reliable assembly process is therefore achieved.

In one embodiment, the bolts 132 may be adapted to be received by threaded holes 131 extending vertically into the second manifold 41. Hence, the suspension means may be comprised of the threaded holes 131 disposed on the first surface 43.

Referring to FIGS. 6 and 7, the first fixating beam 31 may be a U-profile beam, which allows for the second manifold 41 to be inserted into the profile. This increases the stability and robustness of the cooling device 10, especially if it comprises a plurality of heat exchanger cores 12. As seen in said FIGS. 6 and 7, the U-profile beam 31 is adapted to receive the second manifold 41, preferably in a close fit. Hence, load can be transferred from the heat exchanger cores 12 in an efficient manner.

With further reference to FIG. 6, the U-beam 31 may comprise holes for receiving the fluid connections 93, 94. Furthermore, the cooling device may comprise an additional protective plate protecting said fluid connections 93, 94.

Although the invention has been described in the above in connection with preferred embodiments of the invention, it will be evident for a person skilled in the art that several modifications are conceivable without departing from the invention as defined by the following claims.

The invention claimed is:

1. An integrally supported cooling device for mounting to a wind turbine nacelle, the wind turbine nacelle having a first face with a longitudinal extension in a wind direction, the cooling device comprising:
    at least one heat exchanger core configured to extend across the wind direction and to define a cooling area of the integrally supported cooling device the heat exchanger core having a first side and a second side arranged opposite the first side in relation to the heat exchanger core,
    a first manifold being arranged along the first side and a second manifold being arranged along the second side, each in fluid communication with the at least one heat exchanger core, the first manifold and the second manifold are extending parallel along the cooling area, wherein the second manifold comprises a suspension, the second manifold being positioned between the first manifold and the suspension, and wherein the cooling device is configured to be mounted to the wind turbine nacelle by suspension of the second manifold to the first face of the wind turbine nacelle via said suspension.

2. An integrally supported cooling device according to claim 1, wherein the cooling device comprises a plurality of heat exchanger cores in a row extending along the cooling area.

3. An integrally supported cooling device according to claim 1, wherein the suspension comprises a first fixating beam extending along a first surface of the second manifold, whereby the first fixating beam is fixed to the first surface of the second manifold via the suspension the first fixating beam being configured to be attached to the first face of the wind turbine nacelle.

4. An integrally supported cooling device according to claim 3, wherein the first fixating beam is fixed to the second manifold via a plurality of bolts.

5. An integrally supported cooling device according to claim 4, whereby the plurality of bolts extends into the second manifold from the first fixating beam in a vertical direction.

6. An integrally supported cooling device according to claim 3, wherein the first fixating beam is a U-profile beam.

7. An integrally supported cooling device according to claim 1, wherein the cooling device further comprises an expansion vessel in fluid connection with one of the manifolds.

8. An integrally supported cooling device according to claim 1, wherein the first manifold is configured to receive a plurality of diagonally extending supporting struts for connecting the cooling device and the first face of the wind turbine nacelle.

9. An integrally supported cooling device according to claim 1, wherein the first manifold and second manifold each have a proximal end and a distal end along a length l of the cooling area, whereby one of the manifolds comprises a coolant inlet arranged in the proximity of the proximal end, and one of the manifolds comprises a coolant outlet arranged in the proximity of the distal end.

10. An integrally supported cooling device according to claim 9, wherein the second manifold comprises the coolant inlet and the coolant outlet.

11. An integrally supported cooling device according to claim 9, whereby the manifolds are connected via a first fluid connection and a second fluid connection, whereby the second manifold comprises a proximal second manifold compartment and a distal second manifold compartment, said manifold compartments being separate from one another, and whereby the first manifold compartment comprises a proximal first manifold compartment and a distal first manifold compartment, said proximal first manifold compartment and said distal first manifold compartment being separate from one another, whereby the first fluid connection connects the proximal second manifold compartment and the distal first manifold compartment, and the second fluid connection connects the proximal first manifold compartment and the distal second manifold compartment.

12. An integrally supported cooling device according to claim 11, wherein the first fluid connection is configured to distribute approximately 45-55% of the cooling fluid entering the proximal second manifold compartment directly to the distal first manifold compartment without the cooling fluid entering the heat exchanger cores.

13. An integrally supported cooling device according to claim 11, wherein the fluid connections are disposed at a distance d along the length l from the proximal end, whereby $0.25l<d<0.75l$.

14. An integrally supported cooling device according to claim 11, wherein the fluid connections are disposed at a distance d along the length l from the proximal end, whereby $0.4l<d<0.6l$.

15. An integrally supported cooling device according to claim 9, wherein the length l is approximately 3-5 metres and a height h of said cooling area defined by the at least one heat exchanger core is approximately 1-2 metres.

16. A wind turbine comprising the nacelle and the integrally supported cooling device according to claim 1.

17. An integrally supported cooling device according to claim 1, wherein the suspension comprises a U-shaped bracket having a main wall parallel to the first manifold and the second manifold and two upright walls extending from the main wall and perpendicular to the first manifold and the second manifold.

18. An integrally supported cooling device according to claim 17, wherein the main wall comprise at least one hole configured to receive a screw or bolt by which the main wall attachable to the nacelle.

19. An integrally supported cooling device according to claim 1, wherein the suspension is fixed to a lower surface of the second manifold, such that when assembled to the nacelle, the suspension is positioned between the second manifold and the first face of the nacelle.

20. A wind turbine according to claim 16, wherein the suspension is fixed to a lower surface of the second manifold, such that the suspension is positioned between the second manifold and the first face of the nacelle.

* * * * *